Patented Mar. 11, 1952

2,588,968

UNITED STATES PATENT OFFICE 2,588,968

ALPHA-ACYLAMINO STYRENES

Joseph B. Dickey and Theodore E. Stanin, Rochester, N. Y., assignor to Eastman Kodak Company, Rochester, N. Y., a corporation of New Jersey No Drawing. Application December 29, 1948, Serial No. 68,054

6 Claims. (Cl. 260—558)

This invention relates to styrene compounds which are substituted in the alpha position of the vinyl group with an acylamino group, polymers thereof, and to methods for preparing the same.

This application is a continuation-in-part of our copending application Serial No. 581,567, filed March 17, 1945 (now U. S. Patent 2,500,025, dated March 7, 1950).

The new compounds of the invention can be represented by structural formula:

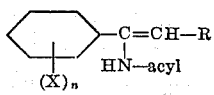

wherein acyl represents broadly a saturated aliphatic carboxylic acid acyl group (e. g., acetyl, propionyl, butyryl, valeryl, lauroyl, stearyl, etc.), an aromatic carboxylic acid acyl group (e. g. benzoyl, naphthoyl, etc.), a heterocyclic acid acyl group (e. g. furoyl), a carbamic acid acyl group (e. g., carbamyl and N-alkyl substituted carbamyl wherein the alkyl group contains from 1 to 4 carbon atoms), an alkyl sulfonic acid acyl group (e. g., methyl sulfonyl, ethyl sulfonyl, propyl sulfonyl, butyl sulfonyl, etc.), an aryl sulfonic acid group (e. g., phenylsulfonyl, p-tolyl sulfonyl, etc.), R represents an atom of hydrogen or an alkyl group containing from 1 to 4 carbon atoms, $n$ represents a whole number of from 1 to 2 and X represents a monovalent substituent from the group consisting of an atom of hydrogen, a hydroxyl group, a halogen atom (e. g., chlorine, bromine, or fluorine), an alkyl group (e. g. methyl, ethyl, propyl, isopropyl, butoxy, etc.), an alkoxy group (e. g. methoxy, ethoxy, propoxy, isopropoxy, butoxy, etc.), a fluoroalkyl group (e. g. trifluoromethyl or difluoromethyl), an amino group (e. g. amino, alkylamino and acylamino, the acyl group being as defined previously), a carboxyl group (e. g., carboxyl, carboxy alkyl esters, carboxy amides and N-alkyl carboxy amides), a sulfo group (e. g., sulfonalkyl, sulfonamide, and N-alkyl sulfonamides).

The above-defined compounds of the invention are valuable intermediates for the preparation of other useful compounds, such as drugs, insecticides, fungicides, and the like. They are polymerizable alone or conjointly with other unsaturated organic compounds to resinous polymers which are useful for the preparation of waterproofing compositions, films, sheets, etc. The copolymers are particularly valuable for the preparation of fibers and for molding purposes where the fibers and the moldings are required to withstand elevated temperatures. The molded or shaped polymers can be worked mechanically to the finished form by known methods of milling, sewing, etc.

In accordance with the invention, the new monomeric alpha-acylamino styrenes can be prepared by treating compounds having the general formula:

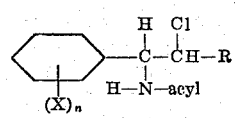

wherein acyl, R, $n$ and X have the same meanings as previously defined, with a suitable base such as, for example, an alkali metal hydroxide (e. g. sodium hydroxide, potassium hydroxide, etc.), an alkali metal carbonate (e. g. sodium carbonate or sodium bicarbonate, potassium carbonate, etc.), an organic base (e. g. sodium ethylate, urea, pyridine, quinoline, triethylamine, tributylamine, diethylaniline, or equivalent bases. Polymerization inhibitors such as hydroquinone, copper acetate, copper chloride, copper carbonate, phenyl-α-naphthalene, etc. can advantageously be employed in the above process. The intermediate saturated chlorine compounds may be prepared by known methods. For example, 1-phenyl-1-benzoylamino-2-chloroethane may be prepared as described by G. H. Coleman et al., J. Am. Chem. Soc., 50 pages 2739 and 2754 (1928), while various other intermediates such as 1-phenyl-1-amino-2-chloro-3-ketobutane may be prepared as described also by G. H. Coleman et al. J. Am. Chem. Soc., 50 page 1816 (1928). The latter compounds containing the free amino group may be acylated by treating the free base or the hydrochloride with the desired acyl halide or by reacting with the desired acid anhydride or isocyanate.

The polymerization of the new alpha-acylaminostyrenes and the new alpha-acylamino vinylstyrenes alone or conjointly with one or more other unsaturated compounds is accelerated by heat and by polymerization catalysts which are known to accelerate the polymerization of vinyl and other unsaturated organic compounds. Exemplary of such catalysts are the organic peroxides (e. g. benzoyl peroxide, acetyl peroxide, lauroyl peroxide, etc.), hydrogen peroxide, perborates (e. g. alkali metal perborates), persulfates (e. g. alkali metal persulfates) and boron trifluoride. The polymerization can be effected in mass or in the presence of an inert diluent (e. g. water, acetic acid, 1,4-dioxane, etc.). However, the monomers can also be emulsified in a liquid in which they are insoluble (e. g. in water) and the emulsion then subjected to polymerization. The monomers can also be suspended in water using a relatively poor dispersing agent such as starch, and polymerized in the form of granules. The monomers can also be copolymerized as above described with one or more copolymerizable unsaturated organic compounds containing the basic $CH_2=C<$ group such as vinyl acetate, vinyl butyrate, vinyl propionate, vinyl trifluoroacetate, methyl acrylate, methyl methacrylate, styrene, ortho-acetamino styrene, alpha-methylstyrene, 2,4-dichloro-alpha-methylstyrene, acrylonitrile, alpha-acetoxy methacrylate, vinyl chloride, vinyl fluoride, vinylidene dichloride, vinylidene chloride-fluoride, vinylmethylketone, trifluoromethyl vinylketone, vinylmethylether, vinyl-ω-trifluoroethyl ether, vinylmethylsulfone, vinyl sulfonamide, trans-β-cyano- and carboxamido-methyl acrylate, vinyl methyl urethane, acrylamide, acrylic acid ethylamide, vinyl phthalimide, vinyl succinimide, acrylic acid, vinyl naphthalene, isobutylene, ethylene, butadiene, alpha-acetoxybutadiene-1,3, and with other unsaturated organic compounds, such as maleic anhydride, methyl maleate, methyl fumarate, etc.

The copolymers of the invention may contain variable amounts of each comonomer and are obtained with starting polymerization mixture having from 5 to 95 molecular proportions of the new unsaturates and from 95 to 5 molecular proportions of the above-mentioned other unsaturated organic compounds. However, the preferred copolymers contain from 10 to 90 molecular proportions of the new alpha-acylamino styrenes and from 90 to 10 molecular proportions of the other unsaturated comonomers, although in the case of copolymers with acrylonitrile and substituted acrylonitriles, the best ratios are from 20 to 40 molecular proportions of the alpha-acylamino styrenes to from 80 to 60 molecular proportions of the acrylonitrile compound. The temperature of polymerization at normal pressures may be varied from 30° C. to 120° C., preferably from 30° to 75° C., although in cases where high pressure is employed the temperature may be as high as 200° C., and where an ionic catalyst such as boron trifluoride is employed the temperature may be as low as —75° C. and still give satisfactory resinous polymers. Where the polymerization is carried out in an inert solvent medium such as previously mentioned, the concentration of the monomers to be polymerized can be varied from 1 to 25 per cent of the weight of the solvent employed.

The following examples will serve to illustrate our new unsaturates, polymers thereof, and the manner of preparing the same.

*Example 1.—Preparation of 1-p-dodecylphenyl-1-amino-2-chloroethane hydrochloride*

135 grams of p-dodecylstyrene were dissolved in 2 liters of carbon tetrachloride at —10° C. To this there was added dropwise over a period of 2 hours, a solution of 20 grams of nitrogen trichloride in 100 cc. of carbon tetrachloride. The reaction gives off nitrogen and precipitates ammonium chloride, the latter being filtered off. Then dry hydrogen chloride was passed into the filtrate and the hydrochloride salt which formed was filtered off. The free base compound had the following structural formula:

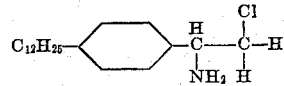

The benzoylamino derivative of the above compound can be prepared in good yield by refluxing the hydrochloride salt in a benzene medium with an equivalent quantity or more of benzoyl chloride, the compound so obtained being the hydrochloride salt of the amine having the formula:

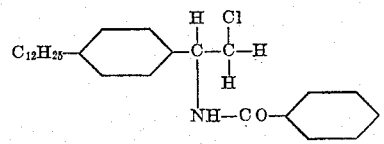

By substituting for the benzoyl chloride, an equivalent quantity of other acyl halides, for example, with acetyl chloride, butyryl chloride, acrylylchloride, ethylchlorocarbonate, methanesulfonyl chloride, etc., the corresponding acylamides can be prepared. In place of the starting material, that is, p-dodecyl styrene, there can be used an equivalent amount of styrene, o-hexadecylstyrene, 2,4-dibutylstyrene, 2,4,6-triethylstyrene, o-acetamino styrene, p-acetamino styrene, o-benzoylamino styrene, p-benzoylamino styrene, etc. to give the corresponding chloramines.

*Example 2.—Preparation of 1-(2,4-dichlorophenyl)-1-amino-2-chloroethane hydrochloride*

125 grams of 2,4-dichlorostyrene were dissolved in carbon tetrachloride and reacted with 25 grams of nitrogen trichloride in 125 grams of carbon tetrachloride at 10° C., following the procedure described in the preceding example. The free base obtained was precipitated as the hydrochloride salt by passing dry hydrogen chloride into the reaction mixture. The white crystalline solid so obtained was put into 100 cc. of ice and water, and then equivalent amount of each of 10 per cent aqueous suspensions of p-toluenesulfonyl chloride and sodium hydroxide solution (10%) were added with stirring. The product separated out of solution and was removed by extraction with benzene. The compound had the structural formula:

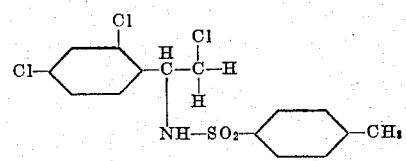

By using the above-described procedure, the amides of any chloramine having the general formula:

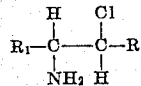

wherein $R_1$ represents a phenyl or a naphthyl nucleus and R represents an atom of hydrogen or an alkyl group, may be prepared by reacting the chloramine compound with any available organic acid halide.

*Example 3.—Preparation of 1-(4-sulfonamidophenyl) - 1 - amino-2-chloroethane hydrochloride.*

150 grams of p-sulfonamidostyrene were reacted as described in the previous examples with nitrogen trichloride and the amine hydrochloride so obtained was filtered off and then added to an equivalent amount of an aqueous solution of sodium cyanate. On standing, there separated out of solution a solid compound having the structural formula:

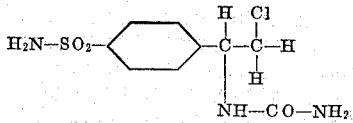

Employing the above-described procedures of Examples 1 and 2, other chloramine intermediates can be prepared such as, for example, 1-(2-carbamyl - 4 - chlorophenyl) - 1 - methanesulfonylamino - 2 - chlorethane, N-1-(2,4-dichloro-5-amylphenyl)-2-chloropropyl phenyl carbamate $$(CH_3—CHCl—CH[2,4,5— Cl_2.C_5H_{11}.C_6H_2]NH.CO.OC_6H_5)$$

1 - (2-decyloxyphenyl)-1-acrylamido-2-caproyl-2-chloroethane, 1-phenyl-1-(4-acetamino benzoylamino) - 2 - chloroethane, 1-phenyl-1-acetamino-2-chloroethane, 1-phenyl-1-furoylamino-2 - chloroethane, 1-(p-proprionylaminophenyl)-1-propionylamino - 2 - chloroethane, 1-phenyl-1-(N-ethylureido)-2-chloroethane, 1-(p-methanesulfonylaminophenyl)-1-acetamino - 2 - chloroethane, 1-phenyl-1-valerylamino - 2 - chloroethane, 1-phenyl-1-lauroylamino-2-chloroethane, 1-phenyl-1-stearylamino-2-chloroethane, etc.

*Example 4.—Alpha-acetaminostyrene*

19.7 grams of 1-phenyl-1-acetylamino-2-chloroethane were warmed with 50 grams of triethylamine on a steam bath until the halogen had all been removed. The reaction product was purified by removing the excess triethylamine by evaporating under reduced pressure, followed by washing the residue with water to remove the triethylamine hydrochloride. The gray solid which remained was crystallized from formamide. Other solvents were equally efficacious for crystallizations such as dimethylformamide, and acetic acid. The reaction was improved by adding a suitable polymerization inhibitor such as hydroquinone, copper acetate or phenyl-α-naphthylamine to the reaction mixture. The compound obtained had the structural formula:

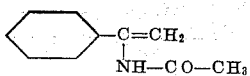

*Example 5.—Alpha-benzoylaminostyrene*

26 grams of 1-phenyl-1-benzoylamino-2-chloroethane and 0.1 gram of copper acetate were warmed on a steam bath with 200 cc. of pyridine until dehydrohalogenation was complete. The reaction mixture was purified by removing the excess pyridine by evaporation under reduced pressure, followed by washing the residue with water. The grayish-white solid which remained was crystallized from acetic acid. The compound obtained analyzed for $C_{15}H_{13}ON$.

*Example 6.—Alpha-methanesulfonamidostyrene*

25 grams of 1-phenyl-1-methanesulfonamido-2-chloroethane and 0.1 gram of copper chloride were warmed in 250 cc. of quinoline until the dehydrohalogenation procedure was complete. The reaction mixture was poured into cold dilute hydrochloric acid, and the precipitate which formed, was filtered off, washed and dried. The product was purified as previously described in Example 4. Analysis showed that the product had the structural formula:

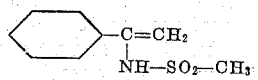

*Example 7.—Alpha-carbamidostyrene*

25 grams of 1-phenyl-1-carbamido-2-chloroethane and 0.1 gram of hydroquinone were warmed in 100 grams of tributylamine and the reaction product worked up to the purified form by the procedure of Example 4. The product was obtained in good yield and had the structural formula:

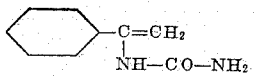

*Example 8.—Ortho-acetamino-alpha-acetaminostyrene*

25 grams of 1-(2-acetaminophenyl)-1-acetamino-2-chloroethane and 0.1 gram of hydroquinone were reacted in pyridine following the procedure described in Example 5. The product by analysis had the empirical formula $C_{12}H_{14}ON_2$.

The procedures described in the preceding examples are generally applicable to the synthesis of any related alpha-acylaminostyrenes. Examples of other compounds contemplated in the scope of our invention are p-hexadecyl-α-propionylamino-β-methylstyrene, N-1-(o-carbamylphenyl)vinyl ethylcarbamate, p-cyano-α-phenylsulfonamidostyrene, p - trifluoromethyl - α - succinylaminostyrene, α-furoylamino - β - acetylstyrene, 2,4-dichloro-α-acetaminostyrene, 2,4-di-n-propyl - α - acrylamidostyrene, p-(N - ethylsulfamyl) - α - hexahydrobenzoylstyrene, p-amido-α-acetaminostyrene, p-hydroxy - α - acetaminostyrene, p-hexadecyloxy-α-diacetaminostyrene, and similar kind of styrene compounds.

*Example 9.—Poly-alpha-acetaminostyrene*

30 grams of α-acetaminostyrene were added to 100 cc. of distilled water in which were dissolved 3 grams of a sodium salt of a sulfonated hydrocarbon and 2 grams of soap flakes. To the emulsion which was obtained, there were added 3 grams of ammonium persulfate and 0.3 gram of sodium bisulfite. After agitating the emulsion at room temperature for 16 hours, it was poured into 300 cc. of saturated sodium chloride solution. The coagulated polymer obtained was washed with water and dried. A yield of 28 grams was obtained. The polymer was molded to a tough, transparent bar, which was unaffected by treatment with boiling water.

*Example 10.—Copolymer of alpha-acetaminostyrene and acrylonitrile*

10 grams of α-acetaminostyrene and 20 grams of acylonitrile were emulsion polymerized and purified following the process described in Example 9. There was obtained 26 grams of a white powder which was soluble in dimethyl acetamide and in dimethyl formamide. A solution of the copolymer in dimethyl acetamide formed filaments by extrusion into water, and these filaments on drafting in air at 140° C., became strong, elastic fibers, which were unaffected by hot ironing at 200° C. The fibers were found to dye readily with both acetate and wool dyestuffs.

*Example 11.—Copolymer of alpha-acetaminostyrene and styrene*

A mixture of 20 grams of α-acetaminostyrene, 80 grams of styrene and 0.5 gram of benzoyl peroxide was suspended in 500 grams of water containing 10 grams of magnesium carbonate. The mixture was heated in a shaking autoclave to 80° C. for 3 hours. The autoclave was cooled and the contents removed. A fine pearly powder was obtained which was filtered off, washed with dilute hydrochloric acid and dried. Moldings made from this polymer were more resistant to heat than polystyrene.

*Example 12.—Copolymer of alpha-acetaminostyrene and methyl methacrylate*

20 grams of α-acetaminostyrene and 80 grams of methyl methacrylate were polymerized as outlined in Example 11. The polymer obtained had good molding properties and the moldings showed improved heat resistance.

*Example 13.—Copolymer of alpha-acetaminostyrene and butadiene*

25 grams of α-acetaminostyrene and 75 grams of butadiene were placed in an autoclave containing 300 cc. of a water solution of 9 grams of soap flakes, 6 grams of dioctyl sodium sulfosuccinate, 1 gram of ammonium persulfate and 2 grams of sodium bisulfite. The autoclave was rocked for 4 hours at room temperature. The latex obtained was poured into a warm concentrated solution of sodium chloride, the coagulated curd obtained being washed in water and on drying gave a tough, rubbery resin, which on vulcanization, gave an excellent rubberlike product.

By substituting for the α-acetaminostyrene in the above example with similar amounts of α-benzoylamino styrene, α-methane sulfonamido styrene, α-carbamido styrene or o-acetamino-α-acetaminostyrene other good synthetic rubbers were obtained.

The polymers and copolymers of the invention all show improved heat resistance. The copolymers of our new α-acylamino styrenes with acrylonitrile or with α-methacrylonitrile are especially valuable, because they can be formed by known methods into tough fibers which accept dyes well, especially those copolymers where the acrylonitrile content is between 60 and 80 molecular proportions of the nitrile to from 40 to 20 molecular proportions of the α-acylamino styrene. The copolymers of our new unsaturates with styrene and with various nuclear substituted styrenes such as, for example, chlorostyrenes, methylstyrenes, etc. are especially useful for preparing moldings which are required to withstand elevated temperatures.

We claim:

1. An alpha-acylamino styrene having the general formula:

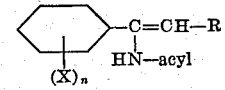

wherein acyl represents a member selected from the group consisting of a saturated fatty acid acyl group containing from 2 to 18 carbon atoms, a benzoylamino group, a naphtholyamino group, a furoylamino group, a carbamyl group, an N-alkyl carbamyl group containing from 1 to 4 carbon atoms, an alkylsulfonyl group containing from 1 to 4 carbon atoms and a phenylsulfonyl group, R represents a member selected from the group consisting of an atom of hydrogen and an alkyl group containing from 1 to 4 carbon atoms, n represents a whole number of from 1 to 2 and X represents a monovalent substituent selected from the group consisting of an atom of hydrogen, a hydroxyl group, a halogen atom, a cyano group, an alkyl group containing from 1 to 10 carbon atoms, a fluoromethyl group, an amino group, an alkylamino group containing from 1 to 4 carbon atoms, an acylamino group containing from 2 to 18 carbon atoms, a carboxyl group, a carboxy alkyl ester group containing from 1 to 4 carbon atoms, a carbamyl group, an N-alkylcarbamyl group containing from 1 to 4 carbon atoms, a sulfonalkyl group containing from 1 to 4 carbon atoms, a sulfonamide group and an N-alkyl sulfonamide group containing from 1 to 4 carbon atoms.

2. An alpha-acylamino styrene wherein the acyl group is a saturated fatty acid acyl group containing from 2 to 18 carbon atoms.

3. An alpha-benzoylamino styrene.
4. An alpha-acetamino styrene.
5. Alpha acetamino styrene.
6. Alpha-benzoylamino styrene.

JOSEPH B. DICKEY.
THEODORE E. STANIN.

REFERENCES CITED

The following references are of record in the file of this patent:

UNITED STATES PATENTS

| Number | Name | Date |
| --- | --- | --- |
| 2,306,410 | Schinzel | Dec. 29, 1942 |
| 2,396,785 | Hanford | Mar. 19, 1946 |
| 2,500,025 | Dickey | Mar. 7, 1950 |